Figure 1:
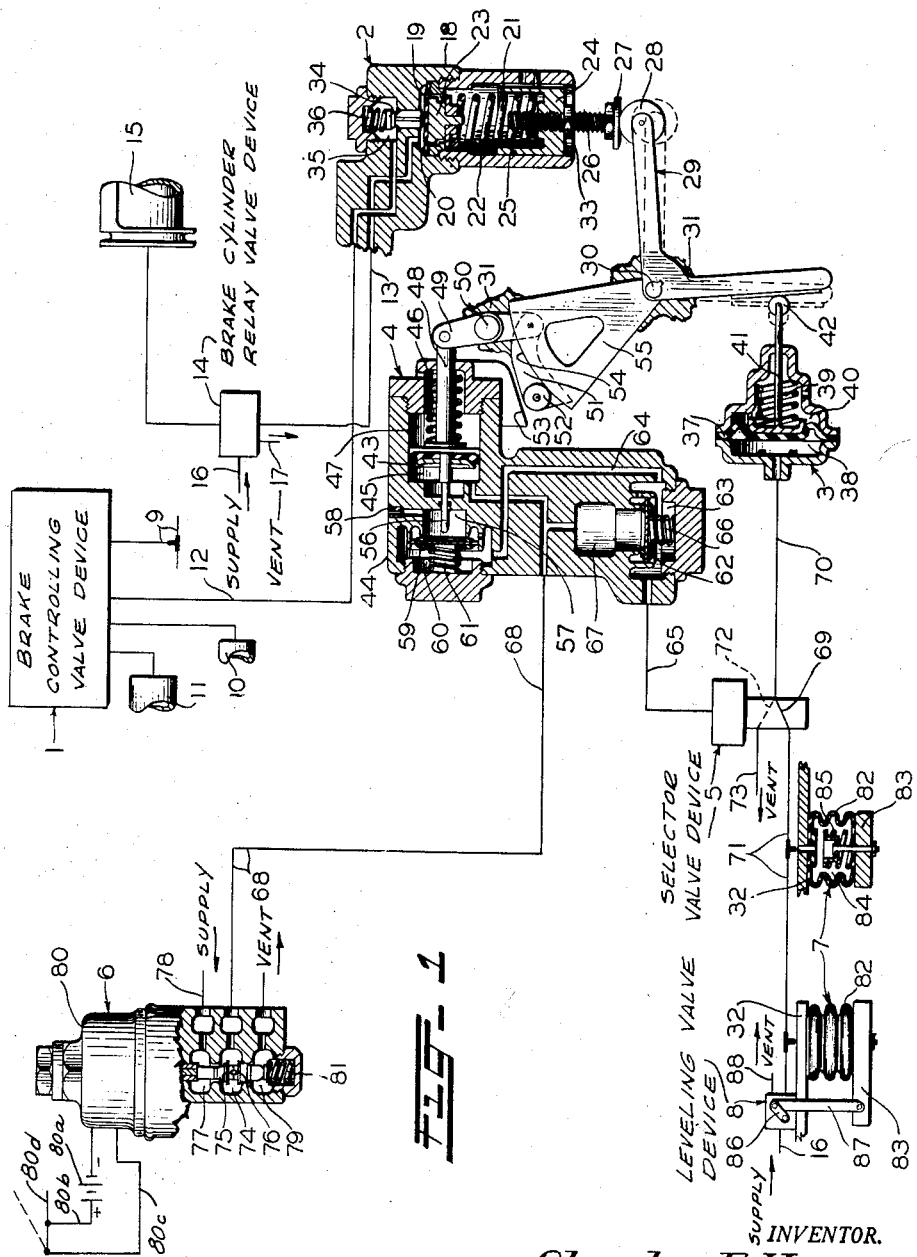

Dec. 29, 1959  C. F. HAMMER  2,919,161
VARIABLE LOAD BRAKE CONTROL APPARATUS FOR RAILWAY CARS
Filed Oct. 30, 1956  2 Sheets-Sheet 1

INVENTOR.
Charles F. Hammer
BY
ATTORNEY

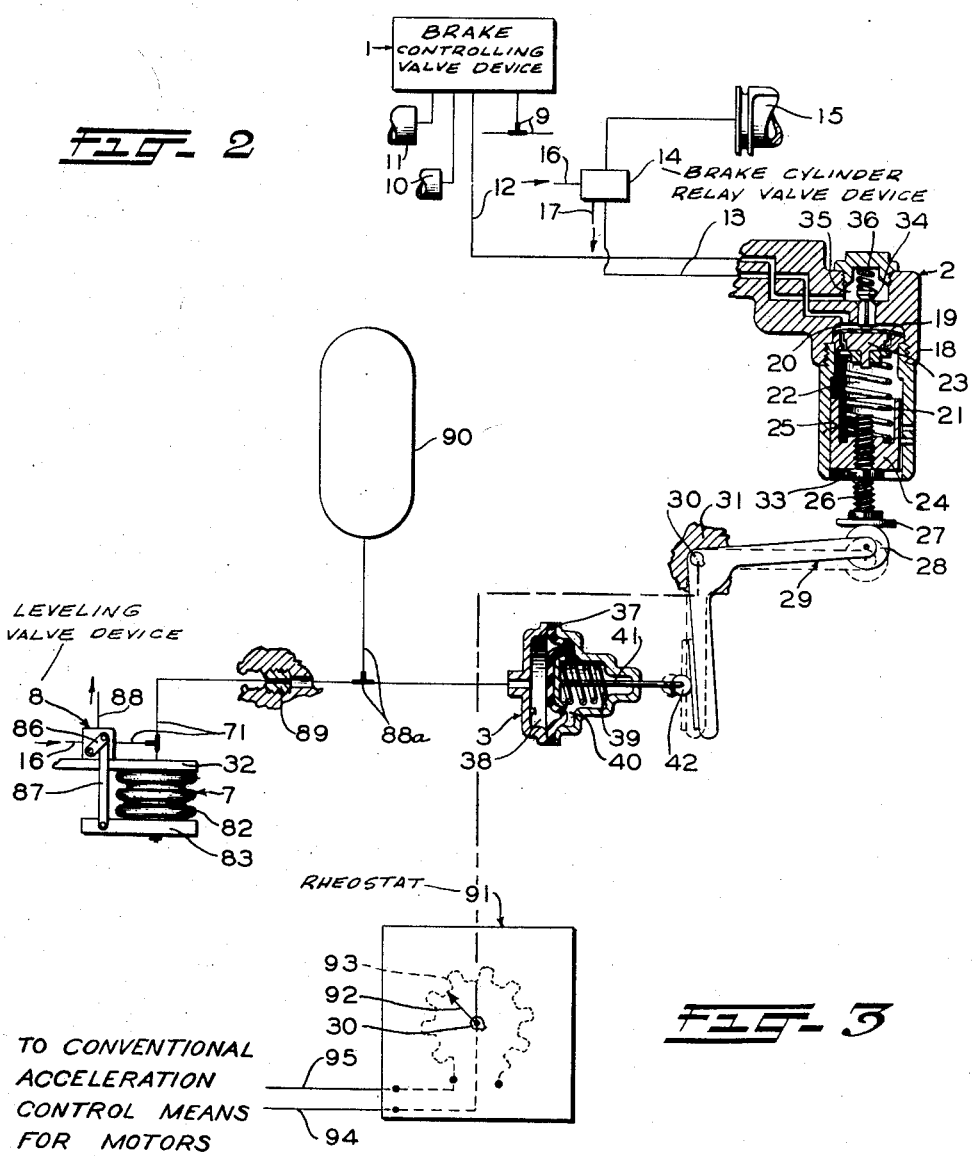

United States Patent Office 2,919,161
Patented Dec. 29, 1959

2,919,161

VARIABLE LOAD BRAKE CONTROL APPARATUS FOR RAILWAY CARS

Charles F. Hammer, Pittsburgh, Pa., assignor to Westinghouse Air Brake Company, Wilmerding, Pa., a corporation of Pennsylvania Application October 30, 1956, Serial No. 619,276

3 Claims. (Cl. 303—3)

This invention relates to variable load brake control apparatus for a hauled railway car or a self-propelled railway car of the type wherein the car body is supported on air springs and pressure in said air springs is varied to maintain the car body at a substantially uniform height above the rails irrespective of the load on the car body.

Since, with cars of the above type, the car body is maintained at a constant height, it is apparent that it is impossible to use conventional variable load brake control arrangements, which are conditioned according to car load as determined by the degree of deflection or compression of the steel truck springs on which the car body is supported.

The principal object of this invention is therefore to provide a variable load brake control apparatus for use on proposed high-speed low-weight railway cars of the type wherein the car body is supported on air springs.

According to this object, a leveling valve operates to provide in the air springs different fluid pressures at different times, as may be necessary to maintain the car body at a preselected uniform height above the rails; and this air spring pressure (which thus is an accurate measure of car load) is tapped off to control operation of a fluid pressure controlled strut device which acts through a bell crank to apply a compressing force, proportional to such pressure, to a regulating spring of a limiting valve device which, in turn, operates to limit the pressure obtained in the brake cylinder according to the degree of such load-controlled compression of said regulating spring.

According to the preferred embodiment of the invention, the bell crank is normally locked in position by a fluid pressure controlled locking device for preventing a change in the degree of compression of the limiting valve regulating spring except when a reset magnet valve is energized, such as upon opening of car doors or upon an emergency application of brakes, so that any variation in air spring pressure caused by vertical oscillation of the car body due to rough track conditions while the train is in motion (and not caused by a change in, or redistribution of, car load) will not affect the setting of the limiting valve; and when the bell crank is so locked, a control chamber of the strut device is vented via a selector valve, which responds to energization of the reset magnet valve to connect said control chamber to the air spring.

According to another embodiment of the invention, the locking device, selector valve and reset magnet valve are eliminated, and the control chamber of the strut device is constantly open to the air spring so that the strut device will be continuously effective, even while the train is in motion, to control rotation of the bell crank to vary the compression of the limiting valve spring and thereby adjust for any shift in load which may occur while the train is in motion; however, a choke is interposed between the control chamber and air spring, and a stabilizing volume is provided at the control chamber side of the choke, to minimize the tendency for any changes in limiting valve spring compression in event of momentary vertical oscillation of the car body, due to rough track conditions, while the train is in motion.

Another object of the invention is to provide, for a self-propelled railway car having a car body of the air-spring supported type, air spring pressure controlled means for controlling operation, according to car load, of conventional acceleration control means for the propulsion motors.

According to the latter object, the bell crank is keyed to a shaft on which it is supported, and rotation of this shaft as an incident to adjustment of compression of the limiting valve spring effects adjustment of the setting of a rheostat to correspondingly vary the resistance in the conventional acceleration control circuit for the propulsion motors.

Other objects and advantages will become apparent from the following more detailed description of the invention and from the accompanying drawings, wherein:

Fig. 1 is a diagrammatic view of a variable load brake and acceleration control apparatus constructed according to a preferred embodiment of the invention;

Fig. 2 is a diagrammatic view of a variable load brake and acceleration control apparatus constructed according to another, simplified embodiment of the invention; and Fig. 3 is a diagrammatic view of a rheostat which adjusts resistance in the electrical circuit that controls operation of the conventional acceleration control means for the propulsion motors of a self-propelled railway car, according to load controlled rotation of a bell crank supporting shaft shown in Figs. 1 and 2.

*Description—Fig. 1*

As shown in this figure, the control apparatus constituting the preferred embodiment of the invention comprises a brake controlling valve device 1, a brake cylinder pressure limiting or regulating valve device 2, a strut device 3, a pneumatically controlled locking device 4, a pneumatically controlled selector valve device 5, a reset magnet valve device 6, air spring devices 7, and a leveling valve device 8.

The brake controlling valve device 1 may be of any well-known type responsive to reduction and restoration of fluid pressure in a brake pipe 9 to effect an application and release of brakes, respectively. However, the valve device 1 is preferably of the graduated application and graduated release type, such as disclosed in the copending application of Earle S. Cook et al., U.S. Serial No. 598,964, filed July 19, 1956, now Patent No. 2,821,-442, and assigned to the assignee of the present invention. This valve device 1 comprises, briefly, valve means (not shown) responsive to a chosen reduction in pressure in the brake pipe 9 below a constant pressure (corresponding to the normal charge value of brake pipe pressure) in a control reservoir 10 to supply fluid under pressure from an auxiliary reservoir 11 to a communication, such as a pipe 12, for causing an application of brakes of a degree corresponding to said chosen reduction; and responsive to a subsequent increase in brake pipe pressure to effect a release of fluid under pressure from pipe 12 for causing a release of breake to a degree corresponding to the extent of such subsequent increase in brake pipe pressure.

The brake cylinder pressure limiting or regulating valve device 2 is interposed between the pipe 12 and a conduit, such as a pipe 13, leading to a brake cylinder relay valve device 14 for limiting the pressure of fluid supplied to said device 14 for thereby causing the latter device to correspondingly limit the pressure of fluid supplied to a conventional brake cylinder 15. This relay valve device 14 may be of any suitable type, such as that disclosed in U.S. Patent 2,096,491, granted October 19, 1937 to E. E. Hewitt and assigned to the assignee of the present invention; said relay valve device comprising, briefly, valve means (not shown) responsive to charging of pipe 13 to supply from a suitable fluid pressure supply pipe 16 to the brake cylinder 15 fluid at a pressure corresponding to the pressure in pipe 13 and responsive to release of fluid under pressure from pipe 13 to connect the brake cylinder 15 to a vent pipe 17 for reducing brake cylinder pressure to the value of pressure in pipe 13.

If preferred, however, the brake cylinder relay valve device 14 may be eliminated and conduit or pipe 13 connected directly to the brake cylinder 15; in which event, pressure in the brake cylinder will be controlled directly according to pressure provided in pipe 12, as limited by the limiting valve device 2, in the manner hereinafter to be described.

The limiting valve device 2 may comprise a sectionalized casing 18 containing a diaphragm 19 subject at one side to pressure of fluid in a chamber 20 open to pipe 13 and subject at the opposite side to pressure of a helical regulating spring 21 in an atmospheric chamber 22. One end of spring 21 bears on a spring retainer secured to a diaphragm follower 23 for the diaphragm 19, and the other end of said spring bears on a cylindrical plunger 24 which is slidable within a casing bore 25 arranged coaxially with said diaphragm. A coaxially arranged adjusting screw 26 having screw-threaded engagement with, and projecting exteriorly of, the plunger 24 has welded to its projecting end a circular follower plate 27 that is engaged by a roller follower 28. This follower 28 is pivotally connected to one arm of a bell crank 29 which is keyed, at its knee, to a shaft 30 that is rotatable within a bearing (not shown) carried by a non-movable member, such as a bracket 31, secured to the car body 32 or other sprung member. The adjusting screw 26 is preferably provided with a lock nut 33 for locking said screw in a desired position in which a desired preadjusted distance is provided between the follower plate 27 and the plunger 24. The plunger 24 has a groove formed in its outer periphery and extending in an axial direction to accommodate a pin that projects through the casing wall and rides in said groove to prevent rotation of the plunger as the spring 21 expands or is compressed.

When chamber 20 is devoid of fluid under pressure, the pressure of spring 21 urges the diaphragm 19 into contact with the fluted stem of a coaxially arranged, tapered limiting valve 34 in a chamber 35 open to pipe 12, for holding said valve unseated against resistance of a helical bias spring 36 in chamber 35; said valve being seatable against a tapered annular valve seat formed in a casing partition encircling the fluted stem and separating the chambers 20 and 35.

The strut device 3 may comprise a diaphragm 37 suitably clamped about its outer edge between sections of a sectionalized casing. The diaphragm 37 is subject to pressure of fluid in a chamber 38 opposing pressure of a light helical bias spring 39 in an atmospheric chamber 40. The diaphragm 37 is operatively connected, through the medium of a diaphragm follower, to a coaxially arranged rod 41 which extends through chamber 40 and projects exteriorly of the casing and carries at its projecting end a roller 42 that engages the other arm of the bell crank 29.

The locking device 4 comprises a piston 43 slidably mounted in a sectionalized casing 44 and subject to fluid pressure in a chamber 45 opposing pressure of a relatively heavy helical bias spring 46 in an atmospheric chamber 47. The piston 43 is operatively connected at its spring side to a coaxially arranged rod 48 that projects exteriorly of the casing and, at its projecting end, is pivotally connected to one end of a substantially straight lever 49 that is fulcrumed intermediate its ends on a pin 50, which may be carried by the bracket 31. Pivotally connected to the other end of lever 49 is one end of a link 51 which, at its opposite end, carries a friction locking element, such as a roller 52; said roller being disposed between a curved surface 53 on a lug projecting from casing 44 and a curved surface 54 provided on a segment-shaped arm 55 keyed at its center for rotation with the shaft 30 and hence with bell crank 29. The surfaces 53 and 54 are of such configuration and so arranged that the roller 52 will act as a wedge between said surfaces to lock the arm 55 in an adjusted position.

Coaxially attached to the side of piston 43 facing chamber 45 is a stem 56 that sealingly and slidably projects through a casing partition separating chamber 45 from a chamber 57 open to atmosphere via a choke 58. The stem 56 is adapted to abuttingly engage and unseat a coaxially arranged disc-shaped check vave 59 that is contained in a chamber 60 and is normally seated by a helical bais spring 61 in said chamber for preventing flow from chamber 60 to chamber 57.

The casing 44 also contains a disc-shaped check valve 62 which is contained in a chamber 63 that is open via a passage 64 to chamber 60 and is also open to a pipe 65 leading to valve device 5. Check valve 62 is biased by a helical spring 66 to a seated position for normally preventing flow to chamber 63 from a chamber 67 that is open to chamber 45 and also to a pipe 68 leading to the reset magnet valve device 6.

The selector valve device 5 may be of any suitable type comprising valve means (not shown) responsive to pressurization of pipe 65 to establish a fluid pressure connection 69 between a pipe 70 leading to chamber 38 of strut device 3 and a pipe 71 leading to the air spring devices 7; and responsive to venting of said pipe 65 to disestablish connection 69 and establish a fluid pressure connection 72 between pipe 70 and an atmospheric vent pipe 73. For example, the selector valve device 5 may be of the type shown in Fig. 2 of U.S. Patent 2,760,612 granted August 28, 1956 to R. C. Brooks and assigned to the assignee of the present invention.

The reset magnet valve device 6 may comprise a casing having a chamber 74 open to pipe 68 and containing two oppositely seating valves 75 and 76 which are coaxially aligned and movable in unison. Valve 75 controls communication between chamber 74 and a chamber 77 constantly charged via a pipe 78 with fluid under pressure. Valve 76 controls communication between chamber 74 and an atmospheric chamber 79. The device 6 also comprises a magnet 80 which, when energized, operatively opens valve 75 and closes valve 76; and when said magnet is deenergized, a helical bias spring 81 in chamber 79 operatively unseats valve 76 and seats valve 75.

Energization and deenergization of the magnet 80 are controlled in the well-known manner by an electrical circuit which is normally open for causing deenergization of the magnet and which is closed for causing energization of said magnet whenever it is desired to have the car load measured, such as when the doors of a passenger car are opened. For sake of simplified illustration, this electrical circuit may comprise a source of electrical energy, such as a battery 80a, having its negative terminal connected to the negative terminal of the magnet 80 and having its positive terminal connected to a supply wire 80b; a wire 80c connected to the positive terminal of the magnet 80; and a manually operable switch 80d for making, as shown, or breaking connection between the wires 80b and 80c, such that said magnet will be energized or deenergized according to whether said connection is made or broken, respectively.

Each air spring device 7 comprises a hollow casing 82 consisting of two flat, spaced, coaxially arranged and preferably circular end walls joined to each other by a corrugated or bellows-like axially expandable portion. Each device 7 is so arranged that the end walls of casing 82 are in vertically spaced relation, with the lower end wall engaging a flat horizontal surface of the axle 83 or other unsprung member, while the upper end wall engages a flat horizontal surface on the car body 32 or other sprung member. Within casing 82 is a chamber 84 that is chargeable with fluid under pressure from the valve device 8 via a branch of pipe 71 for maintaining the car body at a preselected height above the axle 83 and hence above the rails. A helical spring 85, suitably retained to limit the extent of its expansion in the direction of the upper end wall of casing 82, is preferably provided in chamber 84 for supporting the car body 32 at a chosen minimum height (less than aid preselected height) above the axle 83 in event of failure of air supply to chamber 84.

The leveling valve device 8 may, for sake of illustration, be of the type disclosed in the copending application of Harry C. May and Joseph F. Frola, U.S. Serial No. 568,113, filed February 27, 1956, and assigned to the assignee of the present invention. This valve device is mounted on the car body 32 or other sprung member and comprises, briefly, valve means (not shown) controlled by a lever 86 pivotally connected at one end to a rotatable cam shaft and at the opposite end to one end of a link 87 that, at its opposite end, is anchored to an unsprung member (such as axle 83); said valve means being operable by said link, lever and cam shaft to supply fluid under pressure from a branch of supply pipe 16 to chambers 84 of air spring devices 7 via a choke (not shown) and the pipe 71 and release fluid under pressure from said chambers 84 via pipe 71 and a vent pipe 88, as may be required to establish in the chambers 84 different fluid pressure at different times to maintain the car body 32 at the aforementioned preselected height relative to the axle 83. Thus, pressure of air established in the chambers 84 is in accurate measure of the load imposed by the car body 32 on the axle 83.

*Operation—Fig. 1*

Assume initially that the pipes 16 and 78 are charged with fluid under pressure; that fluid pressure in the brake pipe 9 (which was previously charged to its normal charge value) was reduced for effecting an application of brakes; and that the magnet 80 of reset magnet valve device 6 is energized, as for example because the car doors are open to let passengers off the train while it is stopped with brakes applied.

Under these assumed conditions, the brake controlling valve device 1 will have operated to supply, from the previously charged auxiliary reservoir 11 to the pipe 12, fluid at a pressure corresponding to the extent to which brake pipe pressure was reduced below the constant pressure in the control reservoir 10. Fluid under pressure thus supplied to pipe 12 will have flowed via chamber 20 and past the then unseated valve 34 to chamber 35 and pipe 13 for causing the brake cylinder relay valve device 14 to operate to provide in the brake cylinder 15 fluid at a pressure corresponding to the pressure provided in pipe 13. Pressure in pipe 13 will have continued to build up until pressure in chamber 20 increased to a value sufficient to cause diaphragm 19 to deflect against the bias of spring 21, as adjusted in the manner presently to be described; whereupon the valve 34 will have been seated by spring 36 for terminating further flow to the pipe 13 and thereby limiting the pressure provided by the brake cylinder relay valve device 14 in the brake cylinder 15.

With pipe 16 charged, the leveling valve device 8 will have operated to provide in pipe 71 and hence in the chambers 84 of the air spring devices 7, fluid at a pressure sufficient to maintain the car body 32 at the aforementioned preselected height above the axle 83 and hence above the rails. With pipe 78 charged and the magnet 80 energized, fluid under pressure will have been supplied from pipe 78 past the then unseated valve 75 to pipe 68, whence it will have flowed to chamber 45 for shifting the piston 43 of locking device 4 against pressure of spring 46 for thereby causing lever 49 to rock and, through link 51, disengage the roller 52 from the wedging surface 53 of the aforementioned lug on casing 44. Some of the fluid supplied to pipe 68 will also have flowed past check valve 62 to pipe 65 for causing the selector valve device 5 to have operated to establish connection 69, whereby chamber 38 of strut device 3 will be charged with fluid at the pressure then existing in the air spring chambers 84 and which pressure is that necessary to maintain the car body 32 at the aforementioned preselected height above the rails. The pressure of fluid thus admitted to chamber 38 will have caused the diaphragm 37 to deflect against resistance of spring 39 and exert a force, through the medium of the rod 41 and roller 42, on an arm of bell crank 29, as a result of which the bell crank will have rocked relative to bracket 31 and caused the other arm of the bell crank (acting through plate 27 and plunger 24) to operatively compress the spring 21 of limiting valve device 2 for adjusting the bias exerted thereby on the diaphragm 19; such bias being adjusted to a degree proportionate to the load imposed by the car body 32 on the axle 83, as denoted by the air spring pressure necessary, in view of such load, to maintain the car body at the aforementioned preselected height above the rails. Since both the bell crank 29 and arm 55 are keyed to shaft 30, rocking of the bell crank will have rotated the shaft 30 and thereby the arm 55 to provide clearance between the roller 52, which rides on surface 54, and the lug surface 53.

Hence, under the assumed conditions, the various components of the apparatus will be in the respective positions in which they are shown in the drawing, with the exception of valve 34 of device 2, which valve will be closed.

Assume now that the train is about to leave the station and that the magnet 80 of device 6 is deenergized in consequence of the closure of the car doors and that brake pipe pressure is restored to its normal charge value.

With magnet 80 deenergized, spring 81 will act to seat valve 75 for cutting off pipe 68 from supply pipe 78 and also to unseat valve 76 for connecting pipe 68 to atmosphere via chamber 79. With pipe 68 and hence chamber 45 of locking device 4 vented, the relatively heavy spring 46 will shift piston 43 and hence rod 48 leftward, causing lever 49 to rock in a counterclockwise direction about pin 50 and thus cause link 51 to pull the roller 52 upward along the curved surface 54 of arm 55 until roller 52 is firmly wedged between the surfaces 53 and 54, for thereby locking the arm 55 in position. Meanwhile, as the piston 43 moves leftward, it will cause stem 56 to engage and then unseat the check valve 59 for releasing fluid under pressure from pipe 65, chamber 63 and passage 64 at the restricted rate controlled by choke 58. When pressure in pipe 65 leading to the selector valve device 5 has reduced below a chosen relatively low value, said valve device will operate to disestablish connection 69 and establish connection 72 for venting the strut chamber 38 via vent pipe 73; whereupon spring 39 will act to operatively disengage the roller 42 from the bell crank 29.

It will thus be noted that, upon venting of pipe 68 via the deenergized reset magnet valve device 6, the locking device 4 will operate to lock the arm 55 and hence (through shaft 30) the bell crank 29 in a position in which the latter will operatively maintain the spring 21 compressed to an extent corresponding to the load-controlled air spring pressure; that check valve 62 will prevent immediate release of pressure from pipe 68; and that only after the locking device has moved to locking position and thereby operatively unseated check valve 59 will pressure be released from pipe 65, and then only at the restricted rate controlled by choke 58. This arrangement assures that operation of the valve device 5 to vent the chamber 38 of strut device 3 will be desirably deferred until after the locking device 4 has operated to lock the arm 55 and bell crank 29 in the position they assumed while the chamber was charged. Conversely, upon energization of reset valve magnet 80, fluid under pressure will be supplied via pipe 68 and past check valve 62 for causing the valve device 5 to operate promptly to establish connection 69 for desirably charging the strut chamber 38 to existing air spring pressure before piston 43 of the locking device 4 can move against the relative heavy resistance of spring 46 for operatively unlocking the arm 55; this arrangement thus desirably minimizing the changes in compression of spring 21 which would otherwise occur if all compressing force were temporarily removed therefrom.

Meanwhile, as brake pipe pressure is completely restored to its normal charge value, the brake controlling valve device 1 will operate to completely vent pipe 12 and then effect equalization of fluid pressures in the auxiliary reservoir 11 and control reservoir 10 with brake pipe pressure. As soon as pressure in pipe 12 and hence in chamber 20 of limiting valve device 2 is reduced to a value less than that corresponding to the adjusted bias of spring 21, the diaphragm 19 will be deflected upwardly by said spring 21 and operatively unseat the limiting valve 34 for releasing fluid under pressure from pipe 13 and thus causing the brake cylinder relay valve device 14 to operate to correspondingly reduce brake cylinder pressure.

*Description and operation—Fig. 2*

The control apparatus constituting the other embodiment of the invention and shown in Fig. 2 differs from the embodiment shown in Fig. 1 in that the locking device 4, selector valve device 5 and reset magnet valve device 6 are eliminated; the control chamber 38 of strut device 3 is constantly connected via a pipe 88a and a choke 89 to the pipe 71 leading to the chambers of the air spring devices 7; and a stabilizing volume 90 is connected via a branch of pipe 88a to said control chamber. The choke 89 and stabilizing volume 90 are provided to stabilize the pressure in the control chamber 38 so as to minimize the tendency for the degree of compression of the regulating spring to be varied when, due to momentary vertical oscillation of the car body 32 as a result of rough track conditions, the pressure in the air spring devices may be varied.

With this simplified arrangement, it will be apparent that the diaphragm 37 of the strut device 3 will be constantly subjected to pressure of fluid in the volume 90, which will permit the degree of compression of spring 21 to be continuously varied in accordance with any shift or redistribution of passenger load while the train is in motion, as well as while the train is stopped.

The limiting valve device 2 will operate in the manner described in connection with Fig. 1 to limit brake cylinder pressure according to the degree of compression of spring 21, which in turn is adjusted according to the load carried by the car body 32.

It will be understood that the various components in Fig. 2 are shown in the respective positions they will assume when the brake pipe 9 is charged to normal charge value and brakes are consequently released.

If preferred, however, the stabilizing volume 90 and choke 89 may be eliminated and the pipe 71 connected directly to the control chamber 38 of the strut device 3, in which event the aforementioned choke (not shown) interposed between the leveling valve device 8 and the pipe 71 would damp out variation in the degree of compression of spring 21 to the same degree as it damps out fluctuations in air spring pressure due to rough track conditions. In other words, the strut chamber 38 would be opened without substantial restriction to the air spring chamber 84.

*Descripiton and operation—Fig. 3*

The two embodiments of the variable load brake control apparatus, as thus far described in connection with Figs. 1 and 2, are suitable for use on a railway car which is always hauled dead in a train. If, however, the apparatus is to be employed on railway passenger cars of the self-propelled type, such as subway cars, it is desirable that the acceleration rate of the particular car be varied according to load on that car.

According to a feature of the invention, when the apparatus described in Fig. 1 or Fig. 2 is employed on a self-propelled railway car, the shaft 30 (of Figs. 1 and 2) is provided with an extension which projects into a rheostat 91. A contact arm 92 keyed to the extension of shaft 30 and suitably insulated from said shaft is rotated with the shaft and arcuately sweeps a resistance bank 93 of the rheostat for varying series resistance in an electrical circuit that comprises a lead wire 94, the contact arm 92, the effective or "cut-in" portion of the resistance bank 93, and a lead wire 95. The lead wires 94 and 95 lead to conventional acceleration control means (not shown) for the propulsion motors of each such self-propelled car. This acceleration control means may, for sake of illustration, be of the type disclosed in U.S. Patent No. 2,082,026 granted June 1, 1937 to F. B. Powers, in which case lead wires 94 and 95 would be connected to the "limit relay L" shown in said patent.

It will thus be noted that when the shaft 30 is rotated a degree corresponding to the car load as denoted by the air spring pressure effective in chamber 38 of the strut device 3 (Figs. 1 or 2), the contact arm 92 will move through a corresponding arc for varying the effective resistance of the resistance bank 93 cut into the acceleration control circuit for each self-propelled-type car. If car load increases, the shaft 30 will be rotated in a counterclockwise direction, causing the contact arm 92 to move arcuately in a counterclockwise direction to correspondingly cut out resistance from the resistance bank; and conversely, if the car load decreases, the shaft 30 and hence contact arm 92 will move in a clockwise direction for cutting in more resistance from the bank 93.

Having now described the invention, what I claim as new and desire to secure by Letters Patent, is:

1. A variable load brake control apparatus for a railway car comprising, in combination, an air spring device in which pressure of fluid is varied as necessary to maintain the sprung portion of the car at a constant preselected height above the rails, communication to which fluid under pressure is supplied for causing an application of car brakes, a conduit, means responsive to charging of said conduit to effect an application of car brakes of a degree corresponding to fluid pressure in said conduit, limiting valve means for limiting to an adjustable value the pressure of fluid which may be supplied from said communication to said conduit, strut means having a chamber, a unitary lever rockably carried by the sprung portion of the car and operatively connected to said limiting valve means and said strut means for varying said adjustable value according to variations in fluid pressure in said chamber, a normally vented pipe, magnet valve means operative to charge said pipe with fluid under pressure whenever the doors of the car are opened, selector valve means normally connecting said chamber to atmosphere and responsive to charging of said pipe to provide fluid at air spring pressure in said chamber, and locking means normally biased to a position for operatively locking said lever against rockable movement and responsive to charging of said pipe to operatively unlock said lever for permitting rockable movement thereof, such that with said pipe charged the lever will be unlocked and said selector valve means will admit air spring pressure to said chamber for permitting said strut means to rock said lever for controlling said adjustable value.

2. The combination according to claim 1, including means for controlling series resistance in an acceleration control circuit for the propulsion motors of the car, and means operatively connecting said lever and the series resistance controlling means for controlling such series resistance according to positioning of said lever.

3. A variable load brake control apparatus for a railway car comprising, in combination, an air spring device in which pressure of fluid is varied as necessary to maintain the sprung portion of the car at a constant preselected height above the rails, a communication to which fluid under pressure is supplied for causing an application of car brakes, a conduit, means responsive to charging of said conduit to effect an application of car brakes of a degree corresponding to fluid pressure in said conduit, limiting valve means for limiting to an adjustable value the pressure of fluid which may be supplied from said communication to said conduit, strut means having a chamber, lever means rockably carried by the sprung portion of the car and operatively connected to said limiting valve means and said strut means for operatively varying said adjustable value according to fluid pressure in said chamber, a first pipe, selector valve means for selectively connecting said chamber to said air spring device or to atmosphere according to whether pressure in said first pipe exceeds or is less than a chosen low value, a second pipe to which fluid under pressure is supplied when car doors are opened and from which fluid under pressure is vented when car doors are closed, first check valve means for preventing flow from said first pipe to said second pipe but permitting flow in the reverse direction, second check valve means normally preventing flow from said first pipe to a restricted atmospheric vent, a locking device comprising a piston subject opposingly to pressure in said second pipe and a relatively heavy spring bias and also comprising locking means operatively connected to said piston and wedgeable between said lever means and a fixed part of the sprung portion, said piston being responsive to charging of said second pipe to cause unwedging of said locking means for permitting rockable movement of said lever means and responsive to venting of said second pipe to cause such wedging of said locking means for locking said lever means against rockable movement and also operatively open said second check valve means, whereby upon charging of said second pipe and hence of said first pipe via said first check valve means, said selector valve means will operate to connect said chamber to the air spring device before the piston moves against resistance of said heavy spring bias to effect unwedging of the locking means and whereby upon venting of said second pipe said piston will be moved by said heavy spring bias so as to effect wedging of the locking means before pressure in said first pipe is reduced via said second check valve means and restricted atmospheric vent to below said chosen low value.

References Cited in the file of this patent

UNITED STATES PATENTS

| | | |
|---|---|---|
| 1,720,268 | Farmer | July 9, 1929 |
| 1,801,855 | Farmer | Apr. 21, 1931 |
| 2,071,718 | Williams | Feb. 23, 1937 |
| 2,082,026 | Powers | June 1, 1937 |
| 2,110,703 | Farmer | Mar. 8, 1938 |
| 2,150,576 | Bell | Mar. 14, 1939 |